United States Patent
Cahill

(10) Patent No.: US 11,296,784 B1
(45) Date of Patent: Apr. 5, 2022

(54) OPTICAL TIME DOMAIN REFLECTOMETER HAVING CORRECTED OPTICAL RETURN LOSS MEASUREMENT

(71) Applicant: II-VI Delaware, Inc., Wilmington, DE (US)

(72) Inventor: Michael J. L. Cahill, Melbourne (AU)

(73) Assignee: II-VI DELAWARE, INC., Wilmington, DE (US)

(*) Notice: Subject to any disclaimer, the term of this patent is extended or adjusted under 35 U.S.C. 154(b) by 0 days.

(21) Appl. No.: 17/224,460

(22) Filed: Apr. 7, 2021

(51) Int. Cl.
*H04B 10/071* (2013.01)
*H04B 10/073* (2013.01)

(52) U.S. Cl.
CPC ....... *H04B 10/071* (2013.01); *H04B 10/0731* (2013.01)

(58) Field of Classification Search
None
See application file for complete search history.

(56) References Cited

U.S. PATENT DOCUMENTS

| | | | |
|---|---|---|---|
| 5,673,108 A * | 9/1997 | Takeuchi | G01M 11/3145 356/73.1 |
| 5,754,284 A * | 5/1998 | Leblanc | G01M 11/3109 356/73.1 |
| 7,236,682 B2 | 6/2007 | Lalonde | |
| 7,428,382 B2 | 9/2008 | Soto et al. | |
| 8,655,166 B2 | 2/2014 | Soto et al. | |
| 8,792,091 B2 | 7/2014 | McClean et al. | |
| 8,818,199 B2 * | 8/2014 | Joffe | G01M 11/3145 398/158 |
| 9,494,484 B2 | 11/2016 | Gurusami et al. | |
| 9,601,900 B2 | 3/2017 | McClean et al. | |
| 10,564,068 B2 | 2/2020 | Gurusami et al. | |
| 10,763,958 B2 | 9/2020 | Soto et al. | |
| 2002/0075534 A1 | 6/2002 | Feldman | |
| 2004/0022544 A1 | 2/2004 | Case | |
| 2007/0154215 A1 * | 7/2007 | Zuhdi | H04B 10/071 398/67 |
| 2016/0197672 A1 * | 7/2016 | Scholten | H04B 10/07955 398/10 |
| 2021/0080349 A1 * | 3/2021 | Champavere | G01M 11/3145 |

OTHER PUBLICATIONS

Senko, "Optical Return Loss Measurement," White Paper, dated Sep. 2016, 14-pgs.

* cited by examiner

*Primary Examiner* — Jai M Lee
(74) *Attorney, Agent, or Firm* — Blank Rome LLP

(57) ABSTRACT

An Optical Time Domain Reflectometer (OTDR) module obtains Optical Return Loss (ORL) of a fiber plant. Calibration information is obtained of at least internal OTDR reflections associated with the OTDR module. The OTDR module is connected to the fiber plant. An ORL response is measured due to reflections of an ORL signal transmitted from the OTDR module along the fiber plant, and a peak OTDR response is measured in response to reflections of an OTDR signal transmitted from the OTDR module along the fiber plant. A corrected ORL response of the fiber plant is determined by: using the measured peak OTDR response (e.g., peak value or area under the peak) and the calibration information to calculate the calculated ORL due to internal reflections, and then adjusting the measured ORL response by the calculated ORL to represent the corrected ORL of the fiber plant.

17 Claims, 5 Drawing Sheets

OPTICAL TIME DOMAIN REFLECTOMETER HAVING CORRECTED OPTICAL RETURN LOSS MEASUREMENT

BACKGROUND OF THE DISCLOSURE

Optical Return Loss (ORL) measurements are known in the industry. The ORL can be measured by a dedicated ORL meter, or the ORL can also be part of another piece of testing and measurement equipment, e.g., an OTDR module. Making ORL measurements with other types of equipment may not always be accurate and may suffer from detrimental effects from the equipment itself.

The subject matter of the present disclosure is directed to overcoming, or at least reducing the effects of, one or more of the problems set forth above.

SUMMARY OF THE DISCLOSURE

A method is disclosed herein for operating a module of an Optical Time Domain Reflectometer (OTDR) to obtain Optical Return Loss (ORL) of a fiber plant. Calibration information of intrinsic reflection associated with the OTDR module is obtained. The OTDR module is connected to the fiber plant, an ORL response is measured due to reflection of an ORL signal transmitted from the OTDR module along the fiber plant, and a peak OTDR response is measured due to reflection of an OTDR signal transmitted from the OTDR module along the fiber plant. A corrected ORL response of the fiber plant is then determined by: using the peak OTDR response and the calibration information to calculate a calculated ORL response due to intrinsic reflections of the OTDR module connected to the fiber plant, and adjusting the measured ORL response by the calculated ORL response to represent the corrected ORL response of the fiber plant.

A method is disclosed herein for operating a module of an Optical Time Domain Reflectometer (OTDR) to obtain Optical Return Loss (ORL) of a fiber plant. A test fiber connected to the OTDR module is wrapped about a mandrel. An ORL response is measured due to reflection of an ORL signal transmitted from the OTDR module along the test fiber, and a peak OTDR response is measured due to reflection of an OTDR signal transmitted from the OTDR module along the test fiber. The OTDR module for intrinsic reflection associated with the OTDR module is calculated by determining calibration information relating the ORL response to the peak OTDR response. The calibration information is stored in association with the OTDR module to correct ORL measurements obtained by the OTDR module.

An Optical Time Domain Reflectometer (OTDR) module is disclosed herein for obtaining Optical Return Loss (ORL) measurements of a fiber plant. The module comprises storage, a transmitter, a receiver, and a processing unit. The storage stores calibration information of intrinsic reflection associated with the OTDR module. The transmitter is configured to couple to the fiber plant, and the receiver is configured to couple to the fiber plant. The processing unit is in operable communication with the transmitter and the receiver. The processing unit is configured to: obtain the calibration information, measure an ORL response due to reflection of an ORL signal transmitted along the fiber plant, measure a peak OTDR response due to reflection of an OTDR signal transmitted along the fiber plant, use the measured peak OTDR response and the calibration information to calculate an ORL response due to intrinsic reflections of the OTDR module connected to the fiber plant, and adjust the measured ORL response by the calculated ORL response to represent a corrected ORL response of the fiber plant.

The foregoing summary is not intended to summarize each potential embodiment or every aspect of the present disclosure.

DETAILED DESCRIPTION OF THE DISCLOSURE

Figure 1:
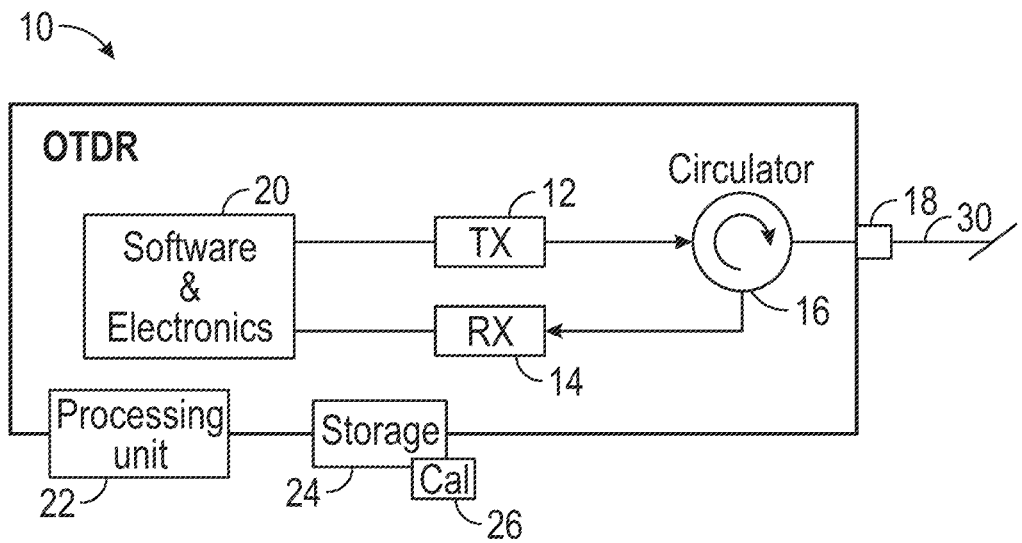
FIG. 1 illustrates an Optical Time Domain Reflectometer (OTDR) module according to the present disclosure.

FIG. 1 illustrates an Optical Time Domain Reflectometer (OTDR) module 10 according to the present disclosure. As disclosed below, the OTDR module 10 can be operated in a standard way to obtain OTDR measurements and traces of a fiber plant or link 30. (The fiber plant 30 can refer to any fiber optic cable; fiber optic cable plant having cable sections, connectors, and splices forming an optical path; or any suitable arrangement. Moreover, the fiber plant 30 may be part of a fiber ring network, mesh network, or any other suitable network.) As further disclosed below, the OTDR module 10 can also be used for obtaining Optical Return Loss (ORL) measurements of the fiber plant 30.

In the functional diagram of FIG. 1, the OTDR module 10 is connected to the fiber plant 30 at one location only (i.e. single-ended). The OTDR module 10 includes software and electronics components 20 connected to a transmitter 12 and a receiver 14. As shown, the transmitter 12 and receiver 14 are connected to the same fiber of the link 30 via a circulator 16 (or other coupling) and a faceplate connection 18. The transmitter 12 transmits signals (a pulse or collection of pulses) into the fiber plant 30. In return, the receiver 14 detects the corresponding response of the fiber plant 30 to the transmitted signal(s).

The software and electronic components 20 connected to the transmitter 12 and receiver 14 can in general include those components conventionally used for the module 10 to perform analog and digital processing of OTDR measurements. As further shown, the components 20 can include a processing unit 22 and storage or memory 24.

The storage 24 can include any suitable storage media for the OTDR module 10. (As described in more detail below, the storage 24 stores calibration information 26 pertinent to internal reflections and faceplate reflections associated with the OTDR module 10.) For its part, the processing unit 22 is in operable communication with the transmitter 12 and the receiver 14 and can include any suitable processing elements, microprocessors, etc. associated with OTDR modules. Although these features of the processing unit 22 and storage 24 may be part of the module 10, they can also be external components of an overlying system with which the module 10 communicates. These and other variations will be appreciated by one skilled in the art having the benefit of the present disclosure.

In performing OTDR measurements, the OTDR module 10 can check the performance of new fiber optics links and can detect problems in existing fiber plants. To do this, the OTDR module 10 operates its high power laser transmitter 12 coupled to the fiber plant 30 to inject appropriate signals (e.g., a series of optical pulses) into the fiber plant 30 under test. From the same end of the fiber plant 30, the receiver 14 of the OTDR module 10 then receives light backscattered (Rayleigh backscatter) or reflected (Fresnel reflection) back from various points along the fiber plant 30. The backscattered and reflected light returned to the OTDR module 10 is then processed by the software and electronics components 20 to produce an OTDR trace that characterizes the fiber plant 30. For example, the trace can indicate splice losses, measure fiber lengths, find faults and their locations, and measure attenuation of the fiber.

Overall, the OTDR trace shows the optical loss and optical reflection of components (cable, connectors and splices) of the fiber plant 30. In this way, the OTDR module 10 can be used to measure the optical properties of the fiber plant 30. The OTDR module 10 can identify the location and strength of optical losses and reflections. Additionally, the OTDR module 10 can estimate the intrinsic loss of the fiber by measuring the strength of the Rayleigh-backscattered signal (RBS).

Additionally, according to the present disclosure, the OTDR module 10 can also be used to estimate the Optical Return Loss (ORL). As is known, ORL is a measurement of what percentage of a transmitted signal is reflected back to the source. The intrinsic ORL of optical fiber can be 32-dB due to RBS. ORL values significantly higher or lower than this value may be indicative of an issue with the fiber plant.

The OTDR module 10 tends to measure reflections external to the module 10 as well as those internal to the module itself. However, operators really want to know the ORL of the fiber plant 30, which is external to the module 10. Therefore, the standard ORL measurement obtained using the OTDR module 10 includes contributions from undesired sources. To determine ORL measurements of the fiber plant 30 that are accurate, the processing unit 22 uses the calibration information 26 stored in the storage 24 of the OTDR module 10 to make corrections for various intrinsic reflections of the OTDR module 10, which can interfere with the accuracy of the ORL measurement. Details of this calibration and adjustment to the ORL measurement are described below.

Figure 2:
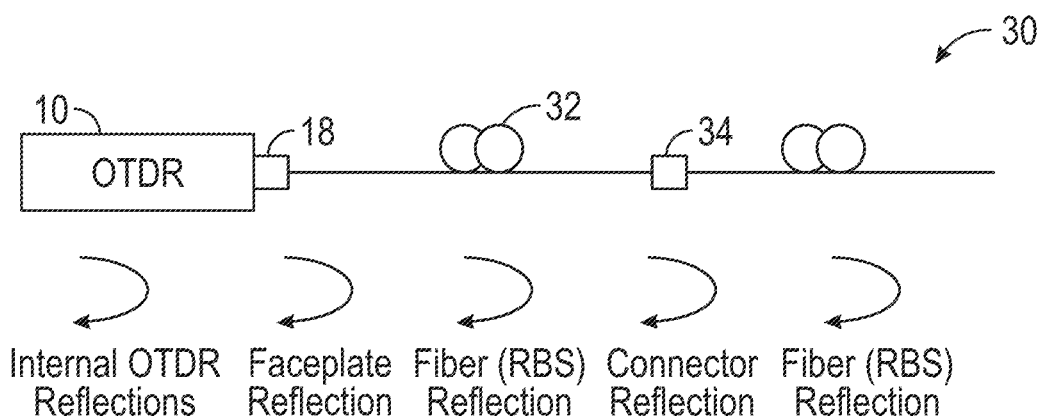
FIG. 2 illustrates the OTDR module obtaining measurements of a fiber plant.

Turning to FIG. 2, the OTDR module 10 is shown obtaining measurements of a fiber plant 30. The OTDR module 10 can be standalone testing and measurement equipment that is connected to the fiber plant 30 for measurement and then removed once done. Alternatively, the OTDR module 10 can be embedded in the plant 30 or a network to monitor operation and performance.

To make the ORL measurement, the OTDR module 10 emits a continuous wave (CW) signal, and the returned signal is comprised of many sources of reflection. As shown in FIG. 2, for example, the ORL measurement using the OTDR module 10 includes all reflections, including those caused by reflections internal to the OTDR module 10 and at the OTDR faceplate connection 18 to the fiber plant 30. In total, the reflections can include internal OTDR reflections, faceplate reflections, various fiber (RBS) reflections, and various connection reflections. The internal characteristics or "imperfections" of the OTDR module 10 that produce the internal reflections and the faceplate reflections are not part of the fiber plant 30 being investigated so they can give misleading results. The OTDR module 10 disclosed herein has the capability of compensating for the imperfections to obtain a "true" or more accurate ORL measurement of the fiber plant 30 (i.e., a calibrated or corrected ORL measurement).

As noted, intrinsic reflections due to the OTDR imperfections may include any internal OTDR reflections, any faceplate reflections, and the like. Internal reflections can be associated with any internal optics of the OTDR module 10, and faceplate reflections can be associated with any fiber optic faceplate, connections, jacks, plugs, adapters, ports, and the like for the OTDR module 10. The faceplate reflections can also include any reflections from a launch lead, patch cord, or the like used with the OTDR module 10. The other reflections due to the optical fiber plant 30, however, may include fiber (RBS) reflections, connector reflections, and the like, depending on the implementation. These other reflections would represent the "true" ORL measurement that an operator wishes to measure. Accordingly, the OTDR module 10 of the present disclosure compensates for the OTDR imperfections so that the ORL measurement due of the optical fiber plant 30 can be more accurately estimated.

Figure 4:
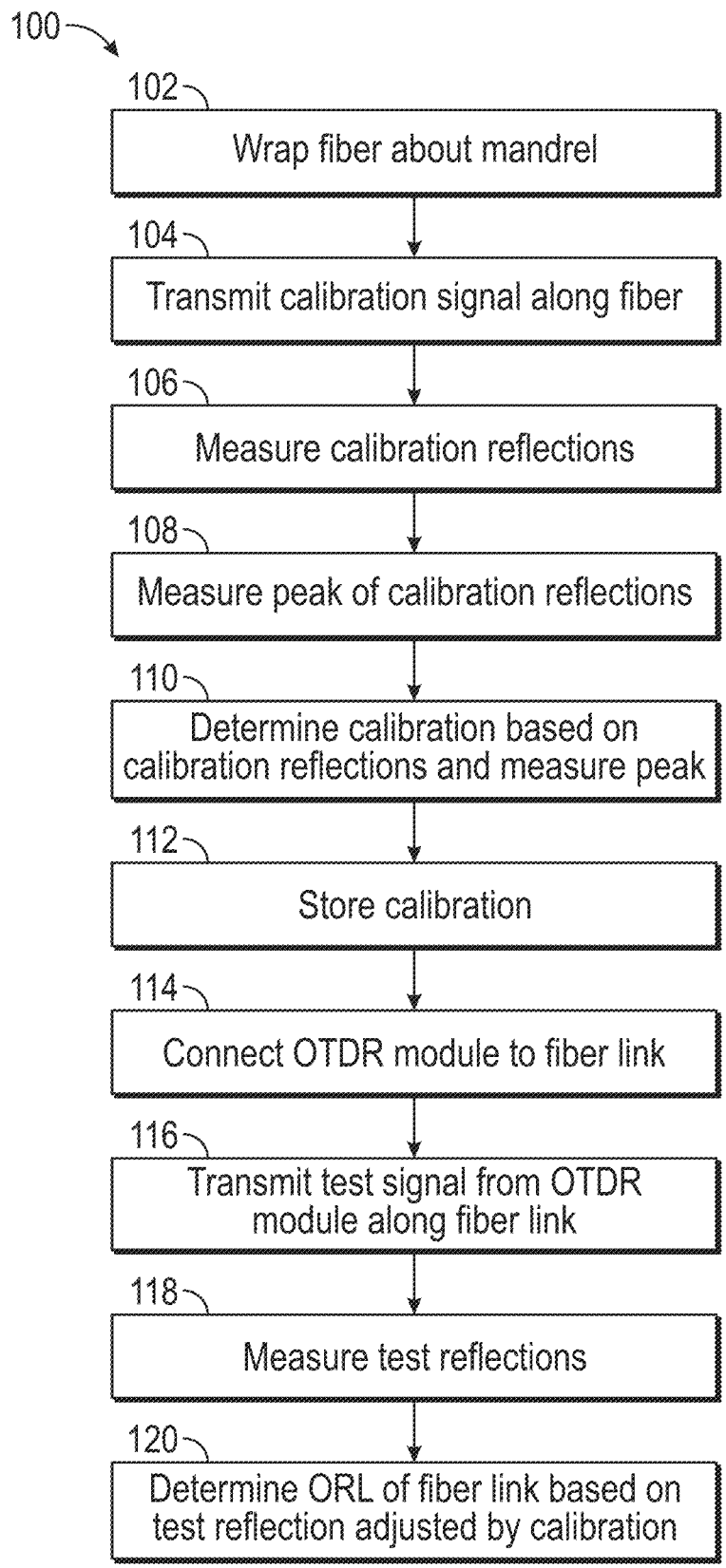
FIG. 4 illustrates a process for calibrating and operating an OTDR module to obtain ORL measurements according to the present disclosure.

Turning to FIG. 4, a process 100 according to the present disclosure for calibrating and operating an OTDR module 10 to obtain more accurate ORL measurements is illustrated in flowchart form. (Reference to elements in other figures is provided for better explanation.)

Based on what has been described above, it can be seen that a given OTDR module 10 that has been designed and manufactured may have intrinsic characteristics or imperfections relative to ORL measurements, and these intrinsic characteristics may be present across a number of such given modules 10 that have been similarly designed and manufactured. Likewise, any intrinsic characteristics or imperfections may be unique to the given module 10 and its faceplate connection 18.

Figure 3:
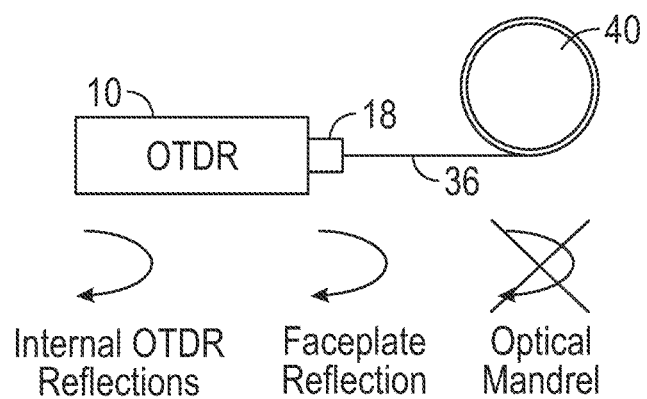
FIG. 3 illustrates the OTDR module obtaining measurements with fiber wrapped about a mandrel.

Taking such a given module 10 and as further shown in FIG. 3, the calibration process 100 obtains calibration information of intrinsic reflections, which include internal reflection associated with the OTDR module 10 and/or reflection from the faceplate connection). In turn, the calibration information can be accessed and used when the OTDR module 10 performs an ORL measurement on a fiber plant 30 under test.

The calibration process 100 involves wrapping a fiber 36 about a mandrel 40, and connecting the OTDR module 10 to an end of the fiber (Block 102). (FIG. 3 schematically shows the OTDR module 10 connected to the fiber 36 wrapped around the mandrel 40.) The diameter of the mandrel 40, the number of wraps of the fiber 36 about its circumference, and other associated details would depend on the particular implementation, the type of fiber 36, the signals used, etc., which would be recognized by one skilled in the art and are not provided here. The OTDR module 10 is located immediately next to the mandrel so that the fiber connection is basically located at 0-m, compared to the long length of the wrapped fiber used.

In the calibration process, the OTDR module 10 transmits a calibration signal from the OTDR module's transmitter 12 along the fiber 36 (Block 104). In turn, the receiver 14 receives calibration reflections of the transmitted signal for measurement (Block 106). The calibration signals include those signals related to ORL and OTDR measurements, as noted herein.

FIG. 3 shows some of the expected reflections. In particular, reflections associated with the fiber 36 wrapped about the mandrel 40 are expected to be attenuated due to the wrapping of the fiber 36 about the optical mandrel 40. According to the power distribution, the type of fiber 36, the modes of propagation, and the like, the fiber 36 is wrapped a defined number of turns about the cylindrical mandrel 40 having a defined circumference. The effective refractive index of the fiber 36 is altered due to the bends about the mandrel 40. This attenuates higher order modes of the signal transmitted through the fiber 36 as the higher order modes are absorbed by the fiber 36 or escape the fiber 36. The wrapping may not affect lower order modes. As a result, the mandrel 40 reduces the strength of the reflected signal so intrinsic reflections (internal to the OTDR module and its connection) will dominate the measurement obtained by the OTDR module 10. Accordingly, intrinsic reflections associated with any internal characteristics of the OTDR module 10 and with the faceplate connection 18 are expected to be received by the module's receiver 14.

The OTDR module 10 then measures a peak of the calibration reflections that are attributed to these sources of reflections (Block 108). The OTDR module 10 is then calibrated to account for intrinsic reflections by determining calibration information 26 that combines the calibration reflections and the measured peak (Block 110). Details of this calibration are discussed later.

The calibration information 26 can then be stored in the storage 24 of the OTDR module 10 in the form of a formula, lookup table, calibration constant, etc. (Block 112). Several calibrations can be performed under different operational factors, and the calibration information 26 can be stored based on those various operational factors as well, such as types of optical fibers, parameters of the OTDR module when operated, temperatures, etc. In this way, the particulars of the calibration 26 can be correlated to operational factors so that the module 10 can access appropriate calibrations in the field associated with the operational factors present.

At this point in the process 100 of FIG. 4, the OTDR module 10 can be used in the field for making ORL measurements on a fiber plant 30. The OTDR module 10 is connected to the fiber plant 30 and can be used to obtain OTDR measurements, such as traces and the like as discussed previously. The OTDR module 10 is further used to obtain ORL measurements. A continuous signal (e.g., a continuous wave signal or a continuously modulated signal of appropriate power, wavelength, etc.) is transmitted from the OTDR module 10 along the fiber plant 30 (Block 116), and test reflections of the transmitted signal are measured by the OTDR module 10 (Block 118).

Using these reflections, the OTDR module 10 determines an ORL measurement of the fiber plant 30 based on the measured test reflections adjusted by the calibration information 26 (Block 120). This determination can involve obtaining the calibration information 26 stored in storage 24 and making an appropriate calculation as disclosed herein.

Having a general understanding of how an OTDR module 10 can be calibrated and then used to measure ORL for a fiber plant 30, discussion now turns to further details of determining a "true" or more accurate ORL measurement of the fiber plant that corrects for the intrinsic reflections (internal reflections and/or faceplate reflections).

As noted above, to estimate the "true" ORL measurement of a fiber plant 30, the OTDR module 10 compensates for the impact of internal and faceplate reflections. Preferably, the compensation accounts for variations in these reflections and is sufficiently accurate to remove large OTDR reflections in order to measure the fiber plant reflections, which would typically have a smaller magnitude.

In general, the compensation uses a calibration function that maps the strength of an OTDR measurement of reflection relative to the strength of an ORL measurement. Once the calibration function is known, then any change that is measured by the OTDR module 10 due to OTDR imperfections can be used to estimate the impact of those OTDR imperfections on an ORL measurement.

As noted above, the ORL calibration process (100: FIG. 4) for the OTDR module 10 involves connecting the OTDR module 10 to fiber 36 wound around a mandrel 40. The OTDR module 40 is then operated to measure the magnitude of the ORL associated with the mandrel 40, $ORL_{Mandrel}$, and to measure the magnitude of the OTDR signal reflection area (or peak) @0-m, $OTDR_{Mandrel\ Area}$. The ORL magnitude $ORL_{Mandrel}$ is obtained by transmitting a continuous signal (e.g., a continuous wave signal or a continuously modulated signal of appropriate power, wavelength, etc.) along the test fiber 36, receiving the reflections from the transmitted continuous signal, and determining the magnitude of the ORL response from the totality of received reflections. The peak OTDR response $OTDR_{Mandrel\ Area}$ is obtained by transmitting an OTDR signal along the test fiber 36, receiving the reflections from the transmitted OTDR signal, and determining a peak magnitude or an area under the peak magnitude of the OTDR signal reflection @0-m from the received reflections. As will be appreciated, the OTDR signal transmitted by the OTDR module 10 can include one or more pulse signals having appropriate pulse width, wavelength, power, timing, and the like. As will also be appreciated, when analyzing the reflected signal, analyzing the area under the peak may be less sensitive to broadening/dispersion of the signal due to various effects.

An ORL calibration constant is given as the summation of these two responses:

$$C_{ORL}=ORL_{Mandrel}=OTDR_{Mandrel\ Area}$$

The ORL calibration constant $C_{ORL}$ describes a relationship between the ORL and OTDR responses, which are suspected to be unchanging with temperature or time.

To illustrate the relationship between the ORL and OTDR responses, an example of ORL calibrations using a mandrel are described in plots of FIGS. 5A through 6B.

Figure 5A:
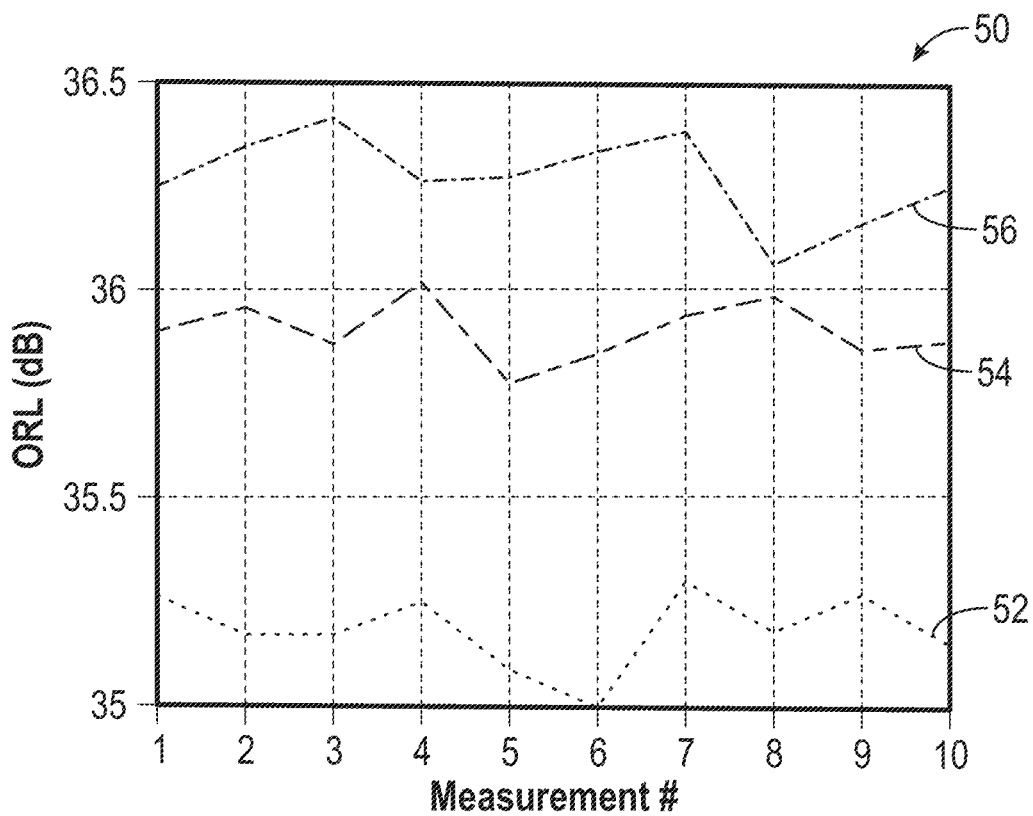
FIG. 5A shows measurements of ORL (dB) during calibration at different temperatures.

FIG. 5A shows a plot 50 of the magnitude (dB) in the y-axis of a number of ORL measurements (#) in the x-axis using an OTDR module 10 connected to fiber 36 wound around a mandrel 40. The measurements have been performed at three different temperatures (−5, 35, 70° C.) depicted by the three curves 52, 54, and 56. Some variations are seen in the reflections over these various temperatures. These variations are likely due to the OTDR module's internal reflections. This shows that the relationship between the ORL and OTDR responses is relatively unchanging with temperature, despite the ORL response and OTDR trace changing with temperature.

Figure 5B:
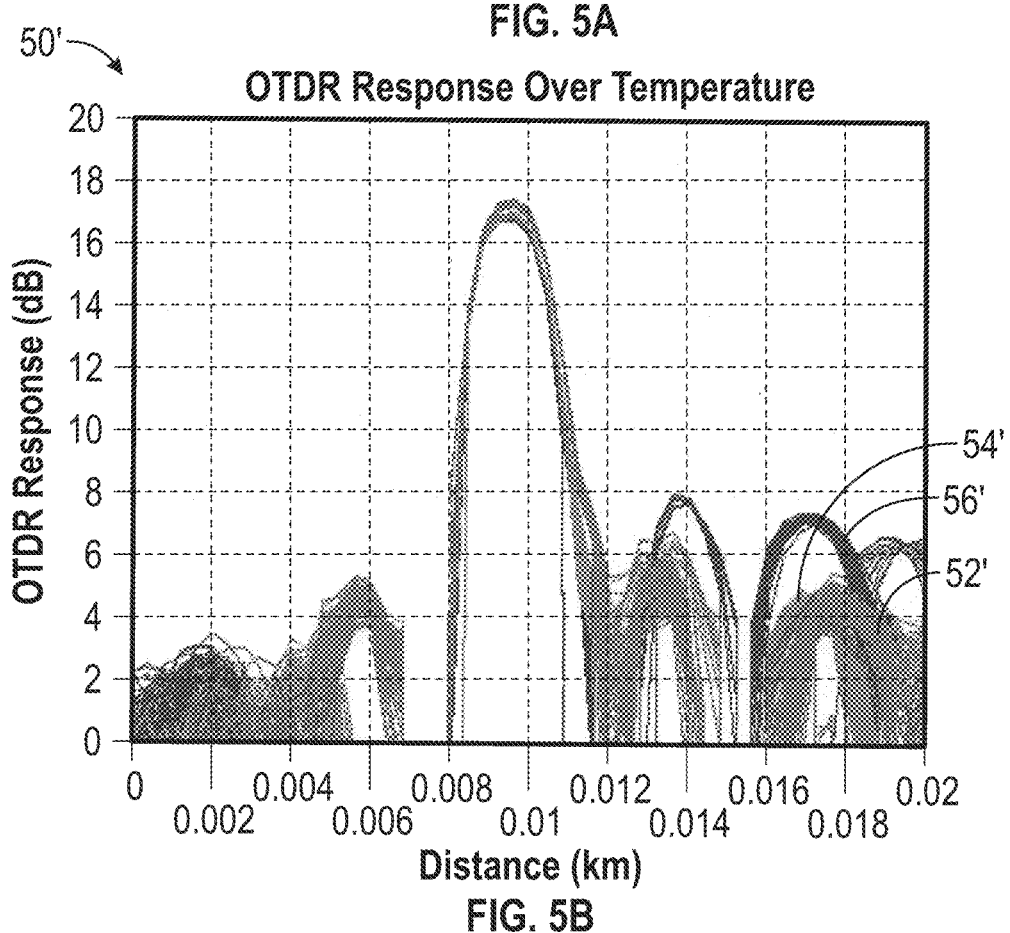
FIG. 5B shows OTDR responses (dB) over temperature during calibration.

FIG. 5B shows a plot 50' of OTDR responses (dB) in the y-axis using an OTDR module 10 connected to fiber 36 wrapped about a mandrel 40 and located at 0-meters from the module 10. The OTDR responses are mapped in the x-axis along the distance (km) of the wrapped fiber 36, and the OTDR response are again provided at three different temperatures (−5, 35, 70° C.) depicted by the three curves 52', 54', and 56'. Overall, a similar change is seen in the OTDR responses over temperature as seen in the ORL measurements. This gives further indication that the relationship between the ORL and OTDR responses is relatively unchanging with temperature.

Figure 6A:
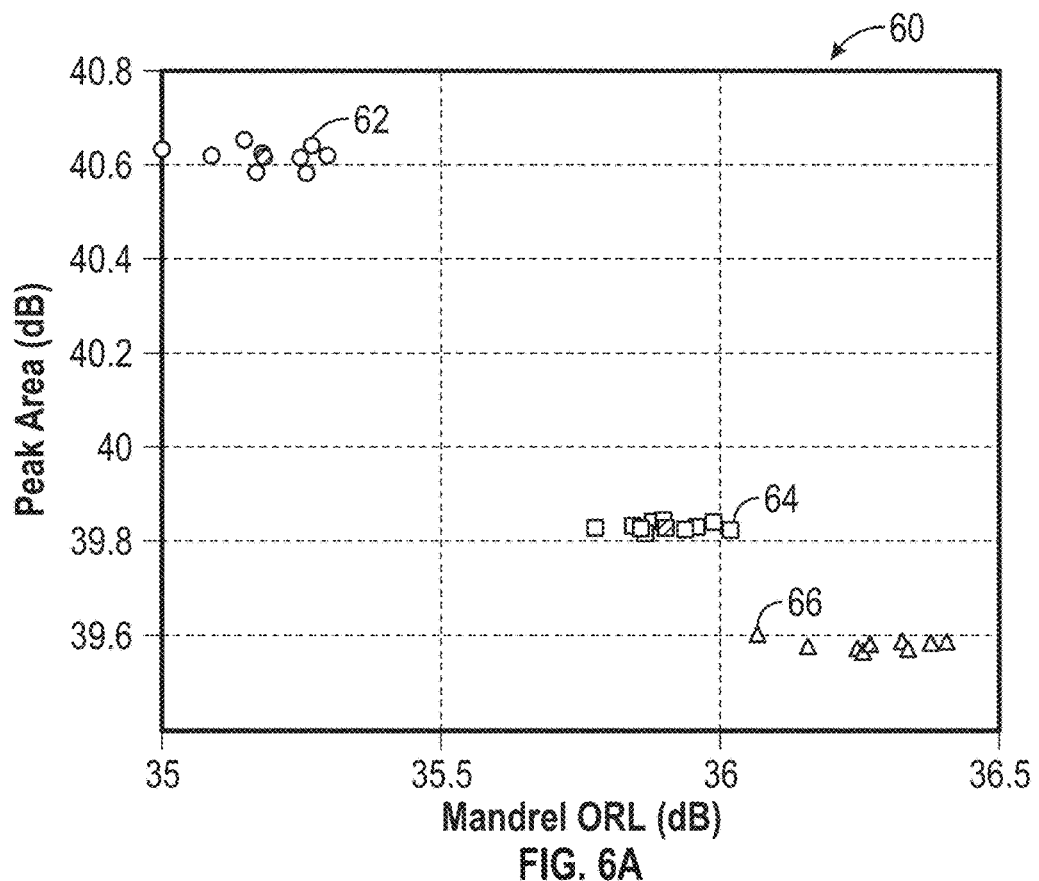
FIG. 6A shows a plot of ORL (dB) measured by the OTDR module with a fiber wrapped about a mandrel (x-axis of Mandrel ORL) versus OTDR Peak Area (y-axis) at three temperatures.

FIG. 6A shows a plot 60 of OTDR peak area (dB) relative to the ORL (dB) measured by the OTDR module 10 from a mandrel 40 wrapped with fiber 36. The ORL (dB) associated with mandrel 40 ("Mandrel ORL") in the x-axis is plotted versus OTDR Peak Area (dB) in the y-axis at the three temperatures 62, 64, and 66. The OTDR peak area is the peak area of the OTDR response at 0-meters (i.e., the peak response due to internal reflections of the OTDR module 10 and/or faceplate connection 18). In the relationship, it can be seen that the ORL response increases as the peak OTDR response decreases at the three temperatures 62, 64, and 66. This gives further indication that, at a given temperature, the ORL responses are related to the peak OTDR responses.

Figure 6B:
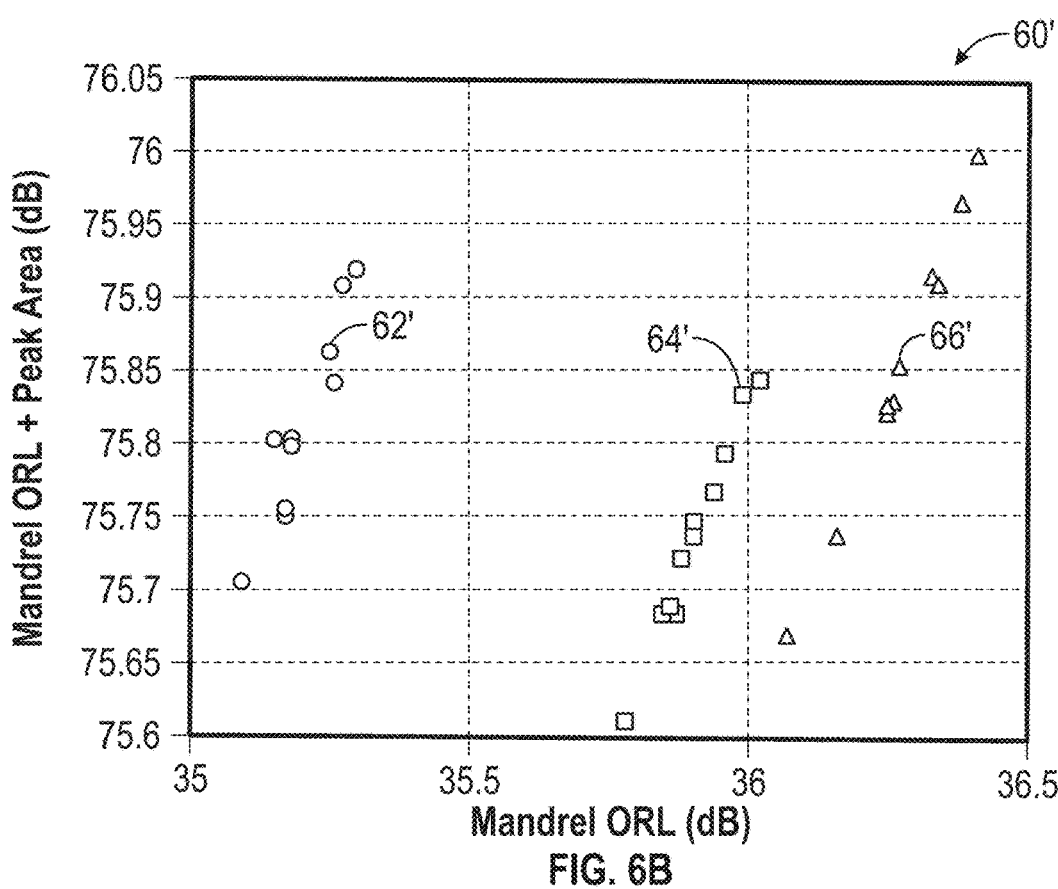
FIG. 6B shows a plot of Mandrel ORL+OTDR Peak Area (x-axis) versus Mandrel ORL (y-axis).

FIG. 6B shows a plot 60' of the Mandrel ORL (dB) in the x-axis versus Mandrel ORL plus OTDR Peak Area @0 m (dB) in the y-axis at the three temperatures 62', 64', and 66'. A comparable plot can also be made of the Mandrel ORL plus OTDR Peak Area (dB) in x-axis versus OTDR Peak Area y-axis. In the present example, the summation of the Mandrel ORL and the peak OTDR response is relatively constant over temperature (averages vary by <0.15 dB).

In the example discussed here, the ORL constant for the OTDR module 10 under investigation can be determined as:

$$C_{ORL} = ORL_{Mandrel} + OTDR_{Mandrel\ Area} = 75.8\ dB$$

Other implementations may have other values for these variables. Using the calibration constant, the contribution of the OTDR module's reflections can be estimated and can then be removed from an ORL measurement made by the OTDR module 10 of a fiber plant under test.

As noted, the OTDR module 10 is connected to the fiber plant 30 under test, and OTDR signals are transmitted from the module 10, and reflections are received, which can be used in OTDR monitoring. Additionally, the OTDR module 10 measures the peak area of the reflection from the fiber plant 30 at 0-m distance. As noted above, the value of the peak area of reflection @ 0-m gives an indication of the internal reflections and faceplate reflections associated with the OTDR module 10.

The ORL measurement is then measured per standard practice. Again, an ORL signal (e.g., a continuous signal, such as a continuous wave signal or a continuously modulated signal of appropriate power, wavelength, etc.) is transmitted from the module 10, and reflections are received, which can be used in the ORL monitoring. In turn, a corrected or more accurate ORL measurement of the fiber plant is calculated by:

$$ORL_{Plant} = dB\{DBinv(-ORL_{Meas}) - dBinv(OTDR_{Peak\ Area} - C_{ORL})\}$$

In this formula, dBinv( ) represents an inverse decibel transform that converts power in dB to power in magnitude and can be given by dBinv(y)=10y/10 or some similar function. As the formula indicates, the power of the ORL measurement of the fiber plant is related to (equal to) the power of the (−ORL measurement) minus the power of the (OTDR peak area @ 0-m with the ORL constant subtracted therefrom).

Figure 7A:
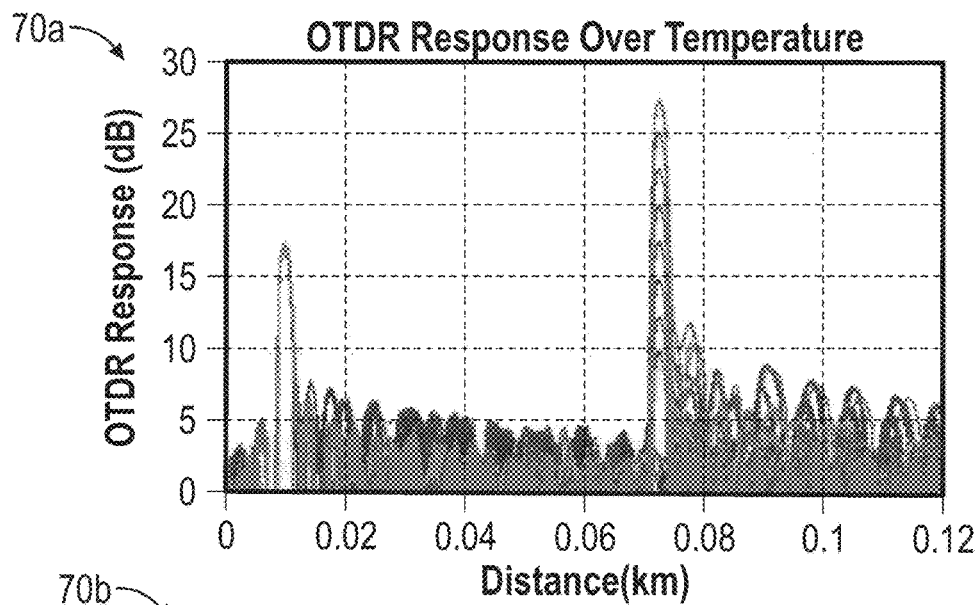
FIG. 7A shows the measurement of OTDR response (dB) relative to distances along fiber at three temperatures.
Figure 7B:
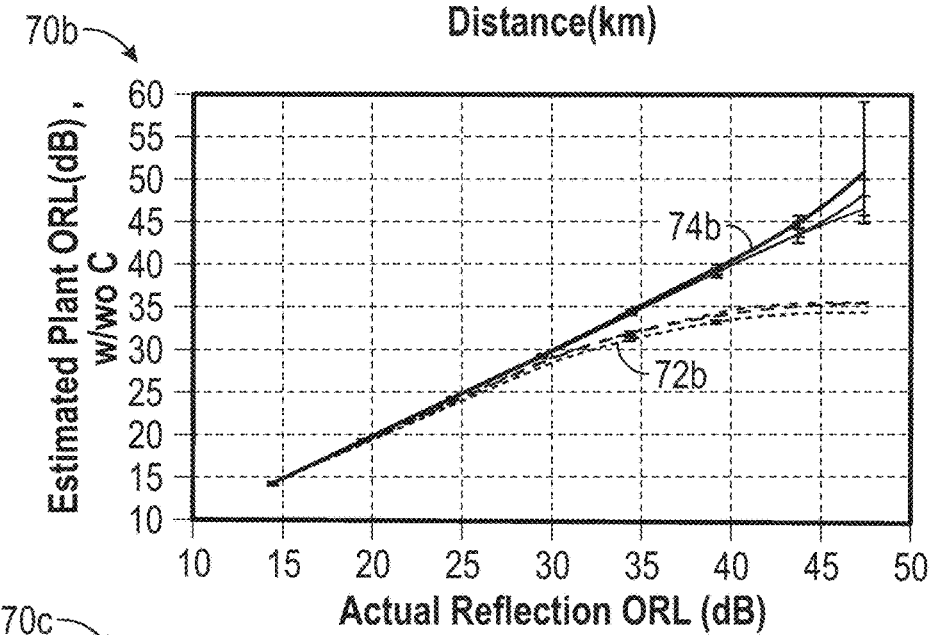
FIG. 7B shows the measured ORL response (dashed lines) and calculated ORL response (solid lines) versus the actual ORL response of a variable reflector.
Figure 7C:
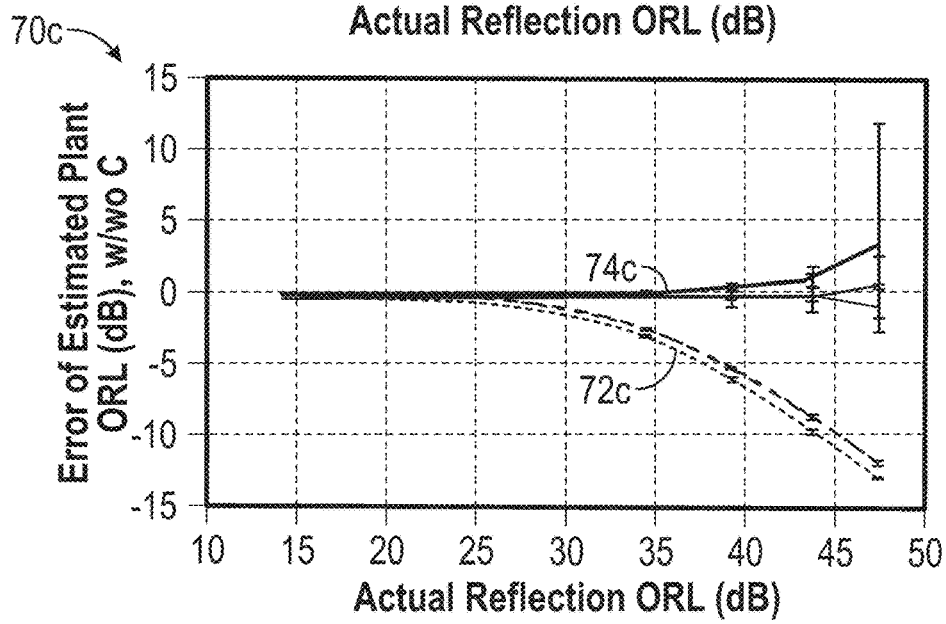
FIG. 7C shows the error of the measured ORL response (dashed lines) and calculated ORL response (solid lines) versus actual ORL response of a variable reflector.

Results for this example of the ORL measurement are provided in plots of FIGS. 7A through 7C.

FIG. 7A shows a plot 70A of the measurement of OTDR response (dB) relative different distances at three temperatures. In this test example, a variable reflector is placed @ 70-m along the fiber plant 30 from the OTDR module 10. The peak area of reflection @0 m is estimated.

FIG. 7B shows a plot 70B of the measured ORL response (dashed lines 72b) and calculated ORL response (solid lines 74b) versus the actual ORL response (x-axis) of the variable reflector @ 70-m. As can be seen, the measured ORL response (dashed lines 72b) is impacted by the reflections internal to OTDR module 10 and does not report the actual ORL response (x-axis) of the variable reflector @ 70-m.

FIG. 7C shows a plot 70C of the error of the measured ORL response (dashed lines 72c) and corrected ORL response (solid lines 74c) versus actual ORL response (x-axis) of the variable reflector @ 70 m. As can be seen, the corrected ORL response (solid lines 74c) corrected according to the teachings of the present disclosure is shown to be accurate up to very high values of ORL. In fact, in this example, the measured ORL is accurate to about 30-dB, and the corrected ORL is accurate to about 45-dB. Accordingly, the teachings of the present disclosure have increased the ORL range in which the OTDR module can make accurate measurements by about 15-dB in this example.

The present disclosure teaches a calibration method and computation for accurate estimation of the optical return loss (ORL) for a fiber plant 30. The method removes effects of various imperfections or the like associated with OTDR module 10 used to make the measurement. When the OTDR module 10 is to be used to measure ORL of a fiber plant 30, a test can be performed and can involve a simple calibration test at room temperature. The parameter associated with the calibration can be stored to fully describe the contribution of OTDR module's imperfections on the measured ORL responses that the module 10 then obtains of the fiber plant 30.

As disclosed herein, the module 10 obtains the calibration information of intrinsic reflection associated with the OTDR module. The OTDR module 10 is connected to the fiber plant 30. An ORL response is measured due to reflection of an ORL signal transmitted from the OTDR module 10 along the fiber plant 30, and a peak OTDR response is measured due to reflection of an OTDR signal transmitted from the OTDR module 10 along the fiber plant 30.

A corrected ORL response of the fiber plant 30 is then determined. A calculation is then made using the measured peak OTDR response and the calibration information to give a calculated ORL response that accounts for the internal reflections of OTDR module 10 and faceplate reflections. The measured ORL response is then adjusted by the calculated ORL response to represent the corrected ORL response of the fiber plant 30 that removes influences of intrinsic reflections (e.g., internal reflections of OTDR module 10 and faceplate reflections). In the end, the OTDR module 10 can have increased dynamic range for making ORL measurements. As seen in the example disclosed herein, the calibration can increase the range of ORL measurements from about 30 dB to about 45 dB. This allows the OTDR module to perform more accurate ORL measurements of optical fiber, which typical has an ORL of about 32 dB. In the end, the ORL measurements obtained by the OTDR module 10 can be more robust and immune to real-world degradations, such as differences in the manufacture of OTDR modules, reflections due to connector cleanliness at the modules' front panels, or changes to reflection of internal components in the modules. In the present example, the OTDR module has demonstrated increased robustness of ORL measurement by about 15 dB. In the end, the measurement disclosed herein can improve the accuracy of ORL measurements for a wider range of ORL responses without a need for additional components added to the OTDR module 10.

The foregoing description of preferred and other embodiments is not intended to limit or restrict the scope or applicability of the inventive concepts conceived of by the Applicants. It will be appreciated with the benefit of the present disclosure that features described above in accordance with any embodiment or aspect of the disclosed subject matter can be utilized, either alone or in combination, with any other described feature, in any other embodiment or aspect of the disclosed subject matter.

What is claimed is:

1. A method of operating a module of an Optical Time Domain Reflectometer (OTDR) to obtain Optical Return Loss (ORL) of a fiber plant, the method comprising:
   obtaining calibration information of intrinsic reflection associated with the OTDR module;
   measuring an ORL response due to reflection of an ORL signal transmitted from the OTDR module along the fiber plant;
   measuring a peak OTDR response due to reflection of an OTDR signal transmitted from the OTDR module along the fiber plant; and
   determining a corrected ORL response of the fiber plant by:
      using the peak OTDR response and the calibration information to calculate a calculated ORL response due to the intrinsic reflections of the OTDR module connected to the fiber plant, and
      adjusting the measured ORL response by the calculated ORL response to represent the corrected ORL response of the fiber plant.

2. The method of claim 1, wherein the intrinsic reflection associated with the OTDR module comprises one or more reflections internal to the OTDR module; and/or one or more reflections from a faceplate connection of the OTDR module.

3. The method of claim 1, wherein obtaining the calibration information comprises retrieving the calibration information from storage of the OTDR module.

4. The method of claim 1, wherein obtaining the calibration information comprises:
   calibrating the OTDR module for the intrinsic reflections by relating an ORL measurement of the OTDR module to an OTDR measurement of the OTDR module.

5. The method of claim 4, wherein calibrating the OTDR module by relating the ORL measurement to the OTDR measurement comprises:
   wrapping a test fiber connected to the OTDR module about a mandrel;
   measuring a calibration ORL response for the ORL measurement due to reflection of an ORL signal transmitted from the OTDR module along the test fiber;
   measuring a calibration peak OTDR response for the OTDR measurement due to reflection of an OTDR signal transmitted from the OTDR module along the test fiber; and
   determining the calibration information relating the calibration ORL response to the calibration peak OTDR response.

6. The method of claim 5, wherein measuring the calibration ORL response comprises transmitting a continuous signal for the ORL signal along the test fiber;
   receiving the reflection from the transmitted continuous signal; and determining a magnitude of the calibration ORL response from the received reflection.

7. The method of claim 5, wherein measuring the calibration peak OTDR response comprises: transmitting a pulse signal for the OTDR signal along the test fiber; receiving the reflection from the transmitted pulse signal; and determining a peak magnitude or an area under the peak magnitude from the received reflection.

8. The method of claim 5, wherein determining the calibration information comprises calculating a calibration constant by combining the calibration ORL response with the calibration peak OTDR response.

9. The method of claim 1, wherein measuring the ORL response due to the reflection of the ORL signal transmitted from the OTDR module along the fiber plant comprises: transmitting a continuous signal for the ORL signal along the fiber plant; receiving the reflection from the transmitted continuous signal; and determining a magnitude of the measured ORL response from the received reflection.

10. The method of claim 1, wherein measuring the peak OTDR response due to the reflection of the OTDR signal transmitted from the OTDR module along the fiber plant comprises: transmitting a pulse signal for the OTDR signal along the fiber plant; receiving the reflection from the transmitted pulse signal; and determining a peak magnitude or an area under the peak magnitude from the received reflection.

11. The method of claim 1, wherein determining the corrected ORL response of the fiber plant comprises:
   subtracting a calibration constant from the measured peak OTDR response to produce a correction of the calculated ORL response, the calibration constant being a combination of an ORL measurement and a peak OTDR measurement of the calibration information; and
   subtracting the correction from the measured ORL response to produce the corrected ORL response of the fiber plant.

12. A method of operating a module of an Optical Time Domain Reflectometer (OTDR) to obtain Optical Return Loss (ORL) of a fiber plant, the method comprising:
   wrapping a test fiber connected to the OTDR module about a mandrel;
   measuring an ORL response due to reflection of an ORL signal transmitted from the OTDR module along the test fiber;
   measuring a peak OTDR response due to reflection of an OTDR signal transmitted from the OTDR module along the test fiber; and
   calibrating the OTDR module for intrinsic reflection associated with the OTDR module by determining calibration information relating the ORL response to the peak OTDR response; and
   storing the calibration information in association with the OTDR module to correct ORL measurements obtained by the OTDR module connected to the fiber plant.

13. The method of claim 12, wherein measuring the calibration ORL response comprises: transmitting a continuous signal for the ORL signal along the test fiber; receiving the reflection from the transmitted continuous signal; and determining a magnitude of the calibration ORL response from the received reflection.

14. The method of claim 12, wherein measuring the calibration peak OTDR response comprises: transmitting a pulse signal for the OTDR signal along the test fiber; receiving the reflection from the transmitted pulse signal; and determining a peak magnitude or an area under the peak magnitude from the received reflection.

15. The method of claim 12, wherein determining the calibration information comprises calculating a calibration constant by combining the calibration ORL response with the calibration peak OTDR response.

16. The method of claim 15, further comprising:
subtracting the calibration constant from a measured peak OTDR response of the OTDR module connected to a fiber plant to produce a correction; and
subtracting the correction from a measured ORL response of the OTDR module connected to the fiber plant to produce a corrected ORL response of the fiber plant.

17. A module of an Optical Time Domain Reflectometer (OTDR) for obtaining Optical Return Loss (ORL) measurements of a fiber plant, the module comprising:
storage storing calibration information of intrinsic reflection associated with the OTDR module;
a transmitter configured to couple to the fiber plant;
a receiver configured to couple to the fiber plant; and
a processing unit in operable communication with the storage, the transmitter, and the receiver, the processing unit being configured to:
obtain the calibration information,
measure an ORL response due to reflection of an ORL signal transmitted along the fiber plant,
measure a peak OTDR response due to reflection of an OTDR signal transmitted along the fiber plant,
use the measured peak OTDR response and the calibration information to calculate an ORL response due to intrinsic reflections of the OTDR module connected to the fiber plant, and
adjust the measured ORL response by the calculated ORL response to represent a corrected ORL response of the fiber plant.

\* \* \* \* \*